J. W. WEINLAND.
EMERGENCY BRAKE BEAM SUPPORT.
APPLICATION FILED SEPT. 18, 1915.
1,165,733. Patented Dec. 28, 1915.
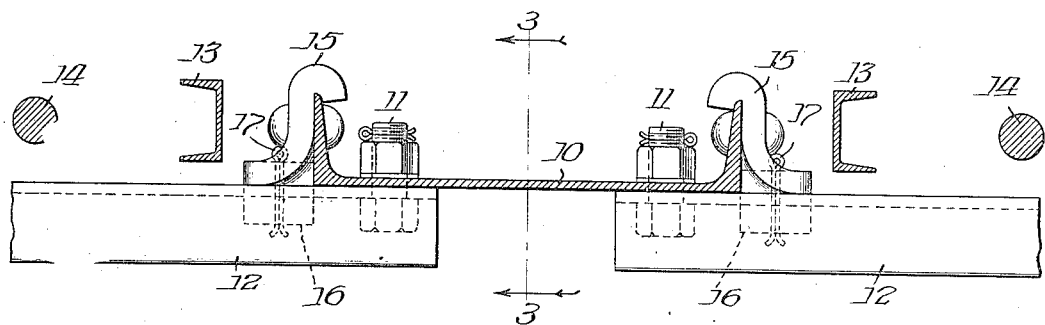
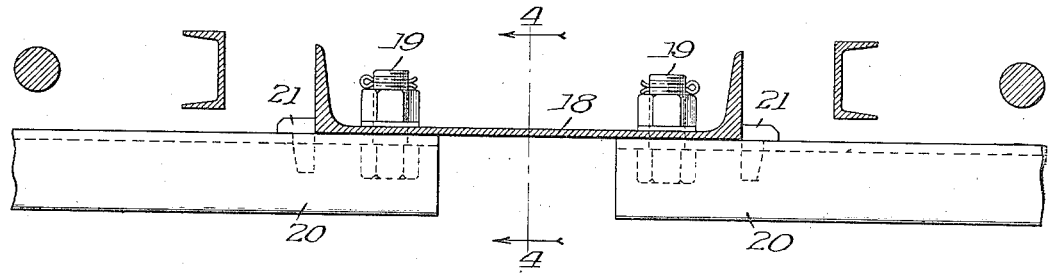
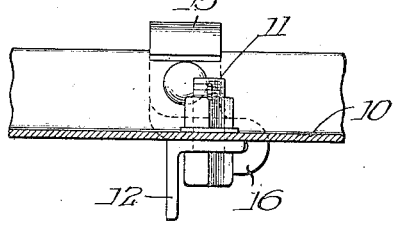
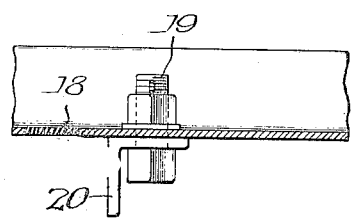

UNITED STATES PATENT OFFICE.

JOSEPH W. WEINLAND, OF CHICAGO, ILLINOIS, ASSIGNOR TO AMERICAN STEEL FOUNDRIES, OF NEW YORK, N. Y., A CORPORATION OF NEW JERSEY.

EMERGENCY BRAKE-BEAM SUPPORT.

1,165,733.

Specification of Letters Patent.

Patented Dec. 28, 1915.

Application filed September 18, 1915. Serial No. 51,334.

*To all whom it may concern:*

Be it known that I, JOSEPH W. WEINLAND, a citizen of the United States, and resident of Chicago, in the county of Cook and State of Illinois, have invented certain new and useful Improvements in Emergency Brake-Beam Supports, of which the following is a specification.

My invention relates to car trucks and has particular reference to a novel emergency supporting means for brake beams.

It is well known that many railway accidents are caused by the dropping of a brake beam due to wear or breakage of the supporting devices therefor.

An object in the present construction is to provide a device which shall normally be out of engagement with the beam but which shall underlie the same and obviate the possibility of accident due to breakage of the supporting devices for the beam.

It is well understood that an emergency support should provide for the ready removal of the beam when desirable in order to effect repairs or replacements thereof and an object in the present construction is to provide means whereby the emergency support may be shifted out of the plane of the beam to permit its being dropped and removed.

The invention will be more readily understood by reference to the accompanying drawings, wherein, Figure 1 is an end view, partly in section, showing one form of my novel supporting means; Fig. 2 is a similar view of a slightly modified form; Fig. 3 is a section taken on the line 3—3 of Fig. 1; and Fig. 4 is a section taken on the line 4—4 of Fig. 2.

Referring more particularly to the drawings it will be seen that I provide a common form of spring or sand plank 10, which may be a channel or similar rolled or pressed shape. This member is adapted to extend between two side frames of a car truck and tie the same together. Pivoted to each side of the channel by means of the bolt 11, is an angular bar 12, the arrangement being such that the bar may be swung on the bolt as a pivot, normally underlying the brake beam, the channel compression member 13, of which and the rod tension member 14, of which are shown in section in the drawings.

In order to assure the retention of the bar in proper position, I provide a supporting bracket 15, the upper end of which is bent and hooked over the flange of a channel and the lower end of which is bent to provide a horizontal hook 16, best shown in Fig. 3. Within the hook portion 16, the horizontal leg of the angle 12, is accommodated. As a means for retaining the bar 12, in engagement with the hook 16, I may provide the cotter or pin 17. In normal operation the bar is held in the position shown in Fig. 1. However, when the beam is to be dropped for removal the cotter 17, is removed and the member 12, is swung into line with the spring plank.

In the construction shown in Figs. 2 and 4, the spring plank 18, bolt 19, and supporting angle bar 20, remain the same. As a means for securing the bar in proper position beneath the brake beam I locate a short pin 21, in the angle bar with the squared head of the pin abutting against the channel of the spring plank. When the pin is in position it will be seen that the bar cannot be rotated on its pivot.

While I have shown a channel spring plank it will be understood that this member may take other forms and also that the bar which underlies the brake beam may be pivoted to other portions of the truck, all without departure from the spirit of my invention.

I claim:

1. In an emergency support for brake beams, the combination of a spring plank, two independent levers pivoted to and projecting laterally from said spring plank and means for securing said two levers in their lateral position, substantially as described.

2. In a brake beam support, the combination of a spring plank, a lever pivoted to said plank, and means for holding said lever in an adjusted position beneath and normally out of contact with said beam, substantially as described.

3. In a brake beam support, the combination of a member adapted to form a part of a car truck, a lever pivoted to said member, and means for securing said lever in a position beneath a brake beam but out of contact therewith, substantially as described.

4. In an emergency support for brake beams, the combination of a spring plank, a pair of levers, each of which is pivoted to and projects laterally from said spring plank, and a hook secured to each edge of said spring plank and adapted to engage said levers in their lateral position, substantially as described.

Signed at Chicago, Ill., this 10th day of September, 1915.

JOSEPH W. WEINLAND.

Witnesses:
CHAS. F. MURRAY,
T. D. BUTLER.

Copies of this patent may be obtained for five cents each, by addressing the "Commissioner of Patents, Washington, D. C."